United States Patent
Woodson

[15] 3,685,786
[45] Aug. 22, 1972

[54] ELASTIC VALVE ELEMENT HAVING VARIABLE ORIFICE

[72] Inventor: Riley D. Woodson, 2012 W. 50th Terrace, Shawnee Mission, Kans. 66205

[22] Filed: Aug. 31, 1970

[21] Appl. No.: 68,106

[52] U.S. Cl. ................................... 251/4, 251/340
[51] Int. Cl. ........................................... F16k 7/02
[58] Field of Search ............... 251/4, 8, 340; 138/45

[56] References Cited

UNITED STATES PATENTS

| 1,657,663 | 1/1928 | Devereux | 251/4 X |
| 3,072,151 | 1/1963 | Quercia | 138/45 |
| 1,883,960 | 10/1932 | Koppel et al. | 251/4 |
| 2,146,917 | 2/1939 | Rosenberger | 251/4 |
| 2,566,588 | 9/1951 | Thompson | 251/4 X |

Primary Examiner—M. Cary Nelson
Assistant Examiner—Richard Gerard
Attorney—Schmidt, Johnson, Hovey & Williams

[57] ABSTRACT

An adjustable orifice valve for applications requiring highly accurate control over the rate of fluid flow employs a resilient, yieldable body having a passage of circular cross-section therethrough, and means for compressing the body in a direction generally parallel to the passage to deform the body inwardly and selectively determine the size of a circular orifice formed in the passage.

3 Claims, 4 Drawing Figures

PATENTED AUG 22 1972
3,685,786
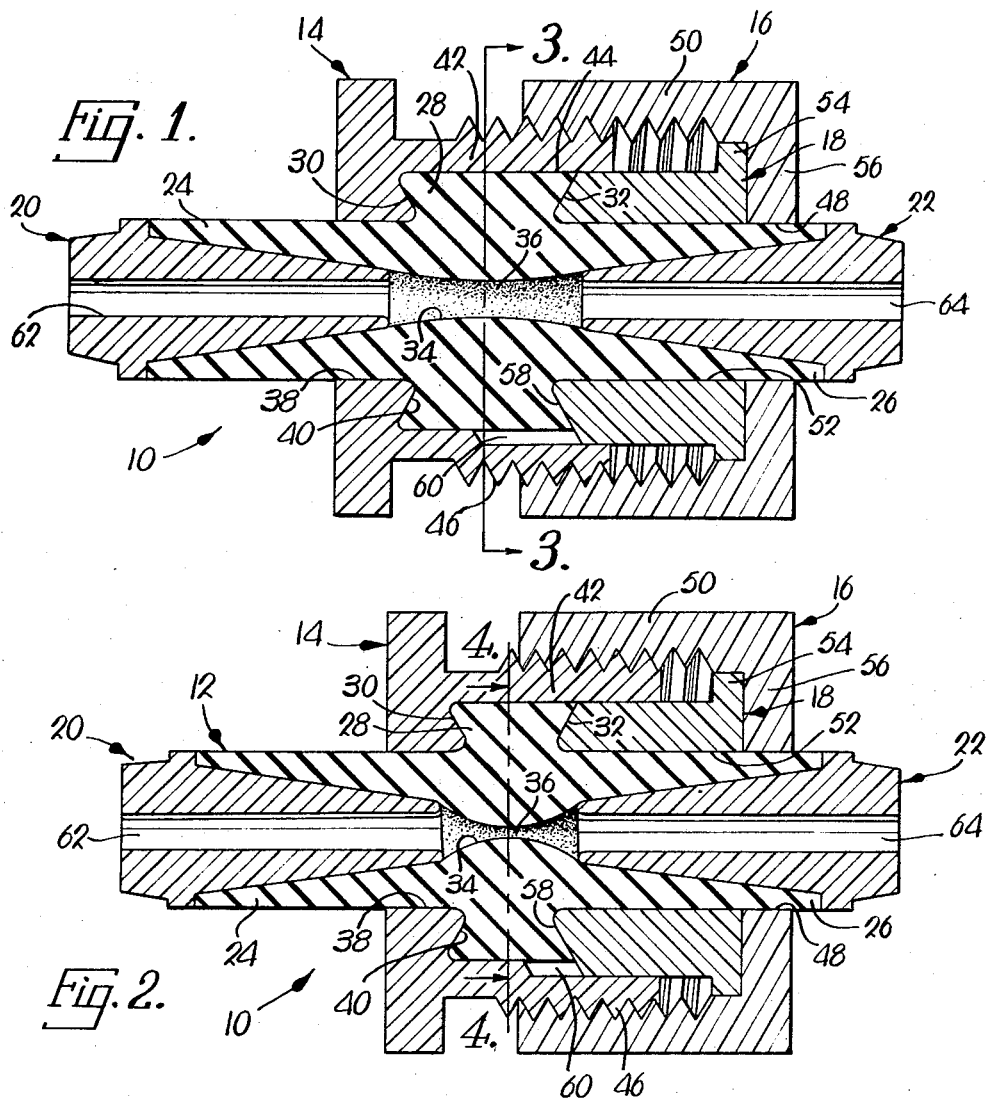
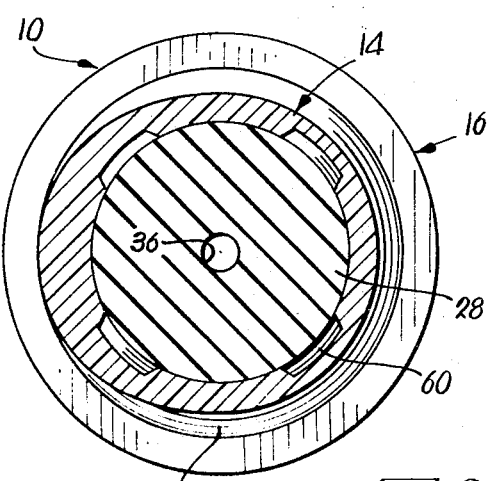
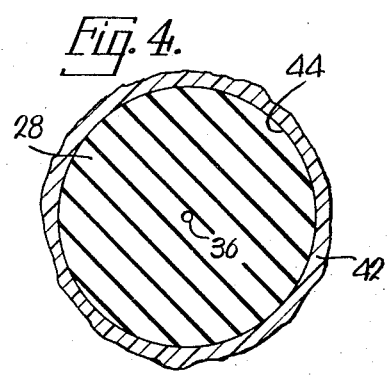
INVENTOR.
Riley D. Woodson
BY
Schmidt, Johnson, Hovey,
Williams & Chase
ATTORNEYS.

ELASTIC VALVE ELEMENT HAVING VARIABLE ORIFICE

This invention relates to improvements in variable orifice valves and, in particular, to a valve of this type in which the variable orifice maintains a circular configuration throughout its range of adjustment.

Many valve applications, including the intravenous administration of fluids to a patient, require extreme accuracy in the control of the flow rate. Medical use also requires that a valve be of sanitary character and preferably of such economical construction as to constitute an expendable, throwaway item which is discarded after use. In other applications such as the control of the flow rate of corrosive fluids, a problem similar to sanitation considerations is presented in providing a valve construction that positively isolates the fluid and is devoid of potential leakage paths. Although variable orifice valves lend themselves to these sanitation and isolation requirements, such valves heretofore have employed an orifice of variable shape, resulting in non-uniform hydraulic characteristics over the range of orifice adjustment.

Accordingly, it is the primary object of this invention to provide an improved variable orifice valve meeting all of the above requirements and having an orifice which retains the same, desired shape regardless of its size.

It is another important object of the invention to provide a valve as aforesaid in which the valving orifice may be accurately adjusted, in minute increments when necessary, and which provides for such adjustment by means entirely external to and not communicating with the orifice or other parts of the passage through which the substance whose flow is to be controlled is passing.

Another important object of the invention is to provide a variable orifice valve in which the orifice is presented by a resilient body defining a part of the fluid-carrying passage, and wherein the body may be selectively compressed in a direction generally parallel to the passage to control the size of the orifice.

Still other important objects and advantages of the invention will be apparent or made clear from the accompanying drawing and from the description of an illustrative embodiment of the invention that follows:

In the drawing:

FIG. 1 is a central cross-sectional view of the currently preferred embodiment of the valve structure of the invention, showing the same in a condition in which the parts are adjusted for providing an orifice of substantially maximum size;

FIG. 2 is a central cross-sectional view similar to FIG. 1 except that the paths are shown in an adjusted relationship in which the size of the orifice has been decreased and accurately set for a predetermined, restricted rate of flow;

FIG. 3 is a cross-sectional view taken on line 3—3 of FIG. 1; and

FIG. 4 is a fragmentary, cross-sectional view taken on line 4—4 of FIG. 2.

The assembly of parts constituting the preferred embodiment of the valve structure of this invention chosen for purposes of illustration is generally designated by the numeral 10 in the drawings. The valve assembly 10 broadly includes a resilient body 12, a sleeve element 14, a collar member 16, a follower 18, and a pair of fittings 20 and 22.

The body 12 is elongated and formed of resilient material such as rubber, yieldable plastic or the like. The body 12 has a pair of end sections 24 and 26 of generally cylindrical external configuration and a central section 28 therebetween. The central section 28 of body 12 is also generally cylindrical but has a greater radius than the end sections 24 and 26, the zones of juncture of the central section 28 with the end sections 24 and 26 being defined by a pair of inclined surfaces 30 and 32 that converge as the cylindrical exterior surfaces of end sections 24 and 26 are approached. A bore 34 extends centrally and longitudinally through the body 12 to present a fluid-carrying passage, the bore 34 flaring outwardly from the center of central section 28 as the ends of the body 12 are approached to define a natural orifice 36 at the zone of minimum diameter of the bore 34 disposed centrally of the central section 28.

The sleeve element 14 has a circular aperture 38 for receiving the end portion 24 of body 12 therethrough, an inclined shoulder 40 for engaging the annular inclined surface 30 of body 12, and a portion 42 extending along and circumscribing the circumferential surface 44 of the central section 28 of the body 12, portion 42 of the sleeve element 14 being externally threaded as at 46.

The collar member 16 is provided with an aperture 48 for receiving the end section 26 of body 12 therethrough and for slidably and rotatably riding upon the external circumferential surface of the latter. The collar member 16 also includes an internally threaded annular portion 50 extending toward and partially overlapping the central section 28 of body 12, such portion 50 of the collar member 16 being threadably mounted upon the threads 46 of the sleeve element 14.

The follower 18 is annular in configuration and includes a cylindrical aperture 52 adapted to slidably fit upon the cylindrical exterior surface of end section 26 of body 12, an end portion 54 disposed to abut against an end portion 56 of the collar member 16, and an opposite inclined surface 58 disposed to abut against the inclined surface 32 of central section 28 of the body 12. The follower 18 and the sleeve element 14 are preferably keyed together as at 60 to permit relative longitudinal movement thereof while preventing relative rotation thereof, so that the follower 18 will not be rotated or twisted upon the end section 26 of body 12 when the collar member 16 is rotated to reciprocate the follower 18.

The fittings or end inserts 20 and 22 are each generally conical in exterior configuration so as to complementally and tightly fit within the tapered ends of the bore 34. If desired, the end inserts 20 and 22 may be additionally secured to the end sections 24 and 26 of the body 12 in any suitable fashion. The end inserts 20 and 22 are provided with central bores 62 and 64, which will preferably be of the same diameter as the conduit sections (not shown) which it will be understood may be coupled to the end fittings 20 and 22 in any suitable fashion in order to interpose the valve assembly 10 in series with a fluid conduit. With the plastic tubing conventionally used as conduit in medical environments, the ends of such conduit sections may simply be fitted over the tapering end portions of the fittings 20 and 22 and then further secured in place thereon by means of adhesive tape or the like.

It will be seen from FIG. 1 and FIG. 3 that the size of orifice 36 formed within the bore 34 centrally of the central section 28 of body 12 will normally be of approximately the same cross-sectional size as the bores 62 and 64 of end fittings 20 and 22 when the collar member 16 is positioned upon the sleeve element 14 to dispose the follower 18 in a position not exerting any substantial compressive force upon the central section 28 of the body 12. This would represent a maximum flow adjustment of the valve assembly 10.

As illustrated in FIGS. 2 and 4, however, as the collar member 16 is screwed further onto the sleeve element 14, the follower 18 is moved toward the shoulder 40 of the sleeve element 14 so as to compress the central section 28 of body 12 between the opposed inclined shoulders 40 and 58 of the sleeve and follower respectively. Since the amount of longitudinal movement imparted to the follower 18 may be controlled in very minute increments by virtue of the threaded coupling between collar 16 and sleeve 14, the amount of compressive force applied to the central section 28 may be accurately controlled over a wide range. As the amount of compressive force thus applied to the central section 28 of body 12 is increased, the entire central section 28 of body 12 will be deformed in a substantially uniform manner by virtue of the elastic nature of the material from which the body 12 is constructed, which results in an inward bulging of the body 12 along the portion of the bore 34 disposed between the adjacent ends of end fittings 20 and 22. Note that the tubular portion 42 of the sleeve element 14 restrains body section 28 against outward expansion, thus only inward bulging can occur. This bulging decreases the cross-sectional diameter of the bore 34 most markedly at the zone of the natural orifice 36 thereof, and, since the rate of fluid flow through the valve assembly 10 is controlled by the cross-sectional area of the fluid passage at its zone of greatest restriction, it will be seen that such adjustments of the size of the orifice 36 make possible the extremely accurate adjustment of the assembly 10 to control the rate of flow of fluid therethrough. In providing the desired and necessary degree of accuracy of such control, it has been found important that the cross-sectional configuration of the orifice 36 and the portions of the bore 34 adjacent thereto be initially circular when the body 12 is in its normal or undeformed condition with the central section 28 thereof not being subjected to compression. Then, as the size of the orifice 36 is controllably decreased by the adjustments hereinbefore mentioned, the cross-sectional configuration of the orifice 36 remains substantially circular in character despite its decrease in size. This point is emphasized in the illustration of the orifice in FIG. 4 as it may be seen that the orifice is still of circular configuration, even though substantially decreased in diameter from its initial size shown in FIG. 3. With the orifice 36 retaining its circular cross-section during adjustment of its size, the control is smooth, continuous and repeatable and the valve remains relatively free of turbulence and is less subject to flow irregularities resulting from the viscosity and surface tension of the flowing fluid.

A final important aspect of the operating capabilities of the valve assembly 10 is that it is intended and adapted for use in completely closing the passage presented by bores 34, 62 and 64 to stop the flow of fluid therethrough, whenever desired. This is achieved merely by continued tightening of the collar 16 upon the sleeve 14 until the central section 28 of body 12 has internally bulged to an extent completely closing the orifice 36. Thus, when it is necessary in appropriate circumstances, the valve assembly 10 may be initially adjusted with full or sufficient compression upon the central section 28 of body 12 to close the orifice 36 so that no fluid flows through the valve assembly 10. The collar 16 may then be "backed off" to initiate flow by slowly turning the same upon the sleeve 14 until only a desired rate of flow of the fluid is permitted.

Those skilled in the art will understand that certain minor modifications or changes could be made from the exact details of construction chosen for illustrative purposes without departing from the true spirit or intention of the invention. Accordingly, the invention should be deemed limited only by the fair scope of the claims that follow.

Having thus described the invention, what is claimed as new and desired to be secured by Letters Patent is:

1. A variable orifice valve assembly comprising:
   a resilient, elongated, generally cylindrical body having a fluid-carrying passage therethrough, said passage including a stretch in which a flow controlling constriction is presented,
   said body including a portion intermediate the ends of the body in circumscribing relationship to said stretch of the passage, said body portion being of greater diameter than longitudinally adjacent parts of the body and having a pair of opposed surfaces spaced longitudinally of the body, said surfaces of said body portion being undercut and inclined toward each other as their inner extremities are approached;
   a sleeve mounted on said body and having an inturned flange provided with a face inclined complementally to one of said surfaces and engageable therewith;
   a follower element having a face inclined complementally to the other of said surfaces and engageable therewith; and
   a collar shiftably, threadably carried by the sleeve and having an inturned flange engageable with the extremity of said follower remote from said face of the latter, said collar engaging said follower to shift the latter for variably compressing said portion of the body in a direction generally parallel to said stretch to deform the body and vary said constriction as the collar is shifted relative to the sleeve.

2. A variable orifice valve assembly comprising:
   a resilient, elongated, generally cylindrical body having a fluid-carrying passage therethrough, said passage including a stretch in which a flow controlling constriction is presented, said passage flaring outwardly from said stretch thereof as the ends of the body are approached,
   said body including a portion intermediate the ends of the body in circumscribing relationship to said stretch of the passage, said body portion being of greater diameter than longitudinally adjacent parts of the body and having a pair of opposed surfaces spaced longitudinally of the body;
   a generally frustoconical, tubular, rigid support member extending into the passage and toward said stretch thereof at each end respectively of the body;

a sleeve mounted on said body and having an inturned flange provided with a face engageable with one of said surfaces;

a follower element having a face engageable with the other of said surfaces; and a collar shiftably, threadably carried by the sleeve and having an inturned flange engageable with the extremity of said follower remote from said face of the latter, said collar engaging said follower to shift the latter for variably compressing said portion of the body in a direction generally parallel to said stretch to deform the body and vary said constriction as the collar is shifted relative to the sleeve.

3. The invention of claim 2, wherein said passage is circular in cross-section; said passage is of gradually decreasing diameter within said stretch as said constriction is approached, the orifice presented by said passage at the zone of said constriction being substantially circular in cross-section throughout the operating range of variable compressions of said body portion produced by shifting of said collar relative to said sleeve.

* * * * *